United States Patent [19]
Clarke et al.

[11] 3,939,869
[45] Feb. 24, 1976

[54] HYDRAULIC CONTROL VALVE FOR REMOTE RECEIVER

[75] Inventors: Peter G. Clarke, Crewkerne; Bernard P. Rayner, Beaminster, both of England

[73] Assignee: Sterling Hydraulics Limited, Crewkerne, England

[22] Filed: Aug. 21, 1973

[21] Appl. No.: 390,256

[30] Foreign Application Priority Data
Aug. 30, 1972   United Kingdom............... 40255/72
Nov. 6, 1972    United Kingdom............... 51066/72

[52] U.S. Cl. ................ 137/595; 137/493; 137/495; 251/250

[51] Int. Cl.² .................... F16K 31/00; F16K 17/00

[58] Field of Search ........ 137/488, 492, 492.5, 596, 137/596.2, 596.7, 630.17, 493, 493.2, 493.4, 493.5, 493.6, 493.3, 493.1, 595; 251/250, 248, 367

[56] References Cited
UNITED STATES PATENTS

| | | | |
|---|---|---|---|
| 2,116,806 | 5/1938 | Zinkil et al. | 137/630.17 |
| 2,188,258 | 1/1940 | Zinkil et al. | 137/630.17 |
| 2,299,367 | 10/1942 | Webb | 137/522 X |
| 2,841,178 | 7/1958 | Schultz | 137/512.5 X |
| 3,215,158 | 11/1965 | Bass, Jr. et al. | 137/269 |
| 3,380,479 | 4/1968 | Bassan et al. | 137/630.17 X |
| 3,722,535 | 3/1973 | Raupp | 137/493.4 |
| 3,820,560 | 6/1974 | Leemann | 137/493.4 |

*Primary Examiner*—Martin P. Schwadron
*Assistant Examiner*—Robert J. Miller
*Attorney, Agent, or Firm*—Baldwin, Wight & Brown

[57] ABSTRACT

A hydraulic control valve for transmitting power from a transmitter to a receiver which is remote from the transmitter. The power is transmitted through an actuating line from the transmitter. The transmitter is in the form of a housing which contains both a pressure relief valve permanently connected to the line and synchronising mechanism for synchronising movement of the transmitter with the receiver.

16 Claims, 7 Drawing Figures

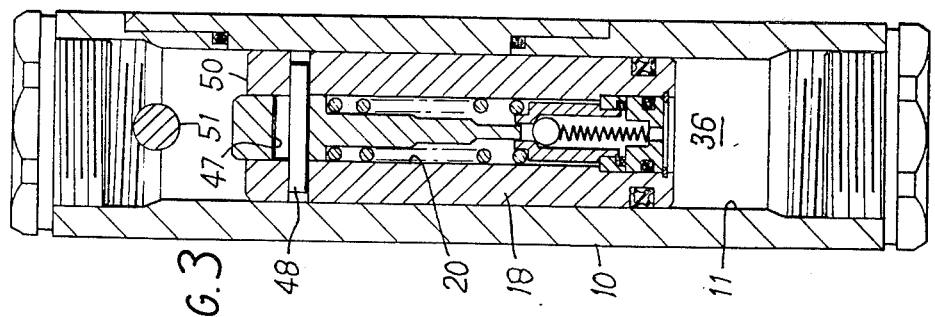
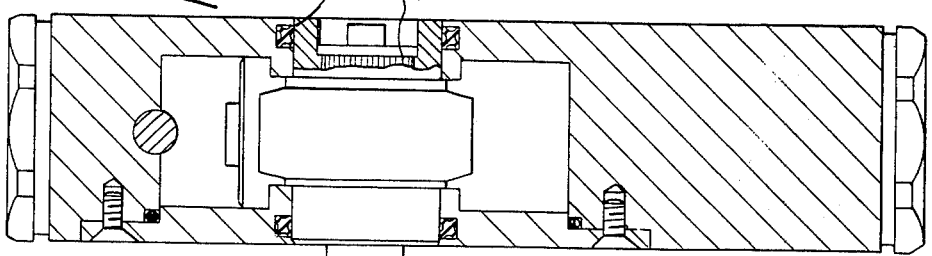
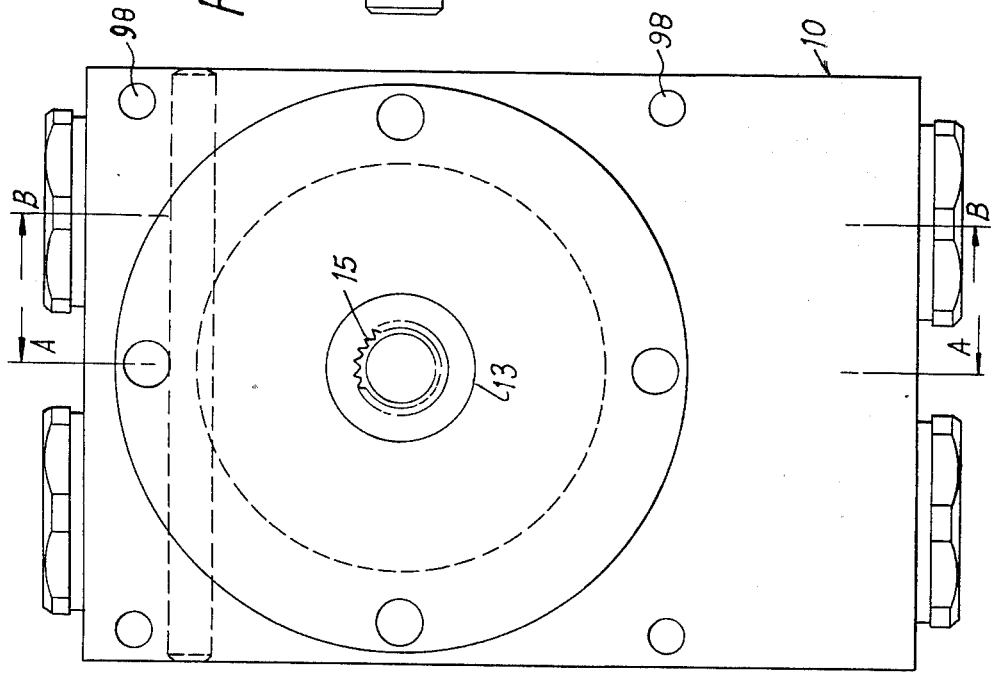

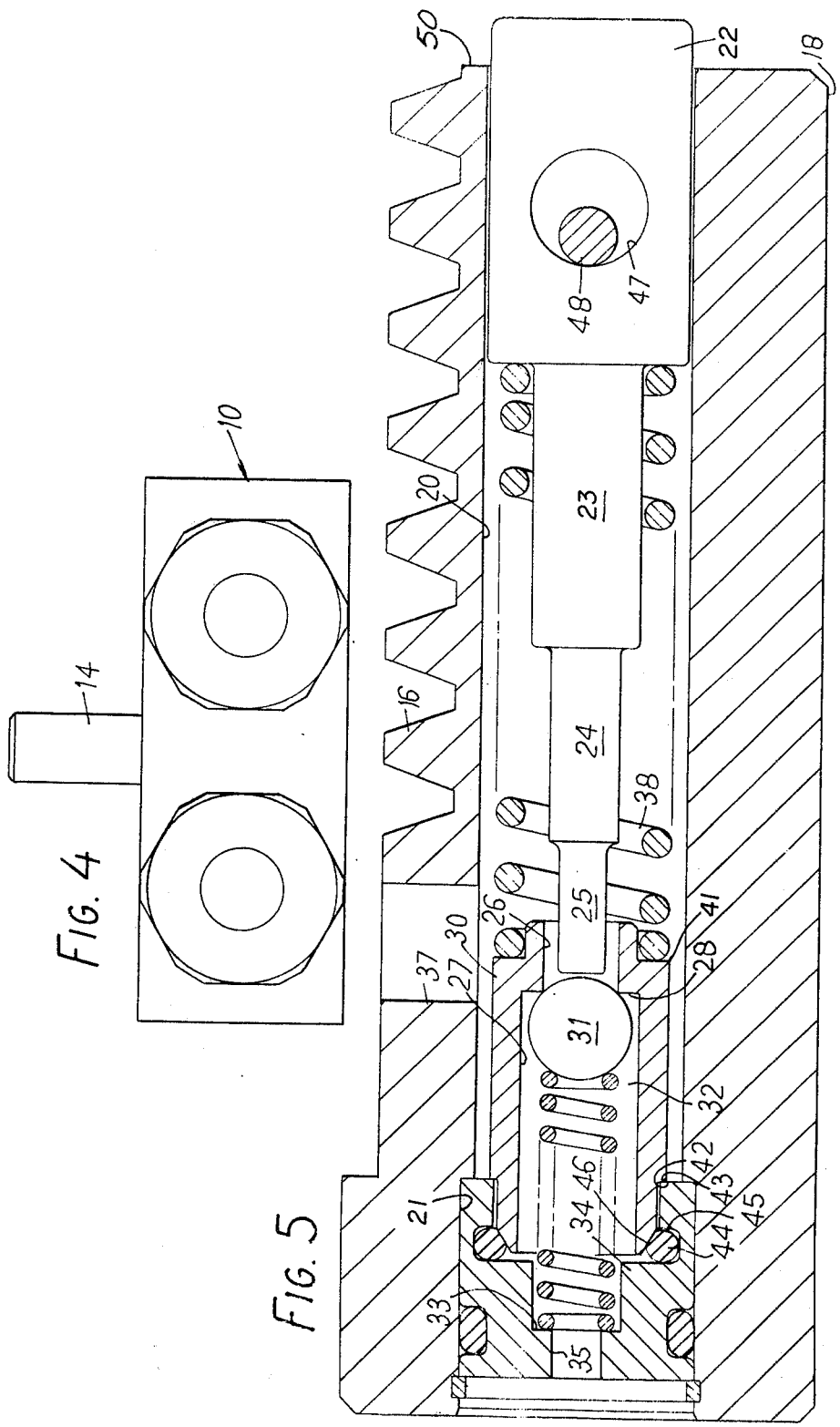

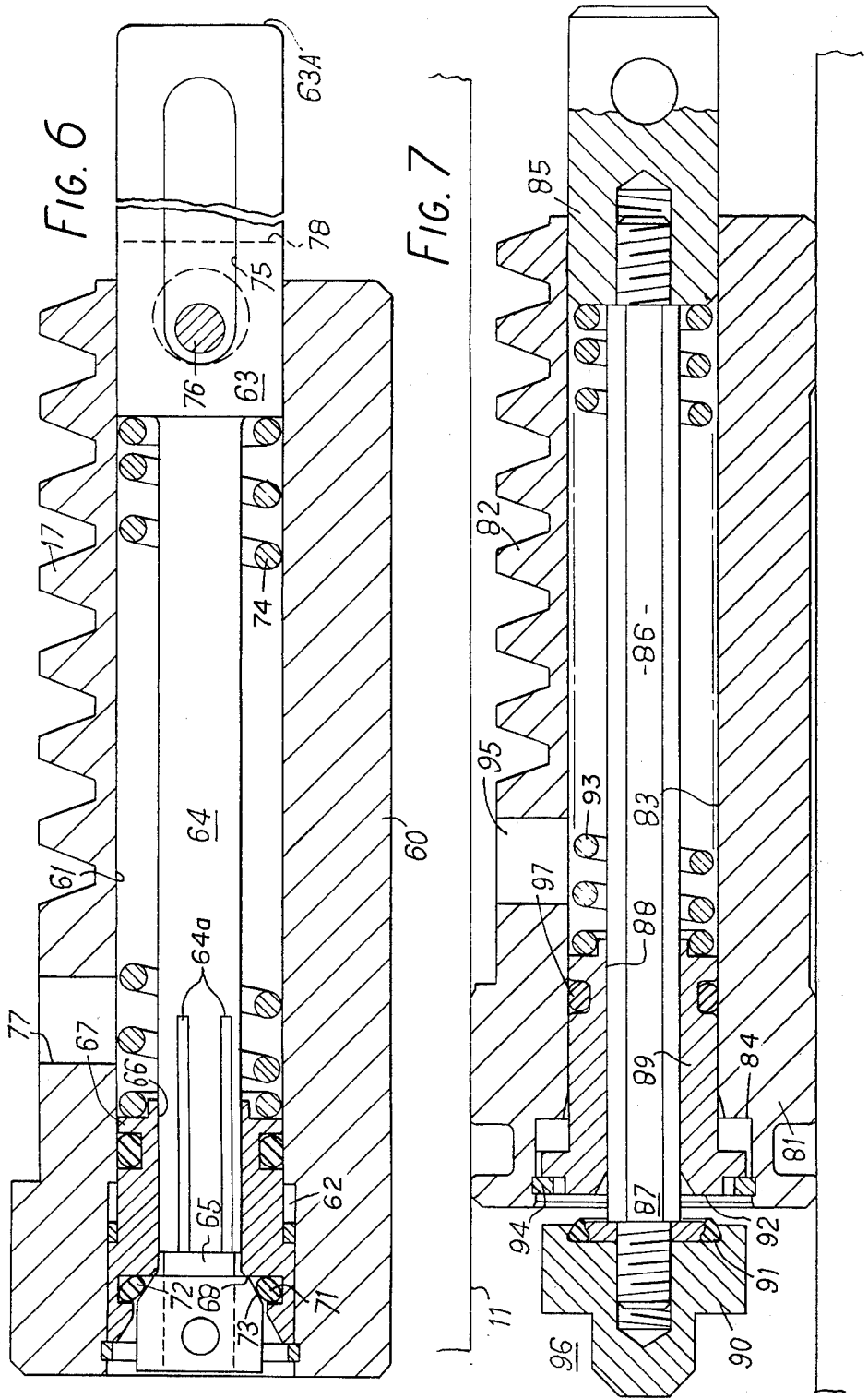

HYDRAULIC CONTROL VALVE FOR REMOTE RECEIVER

This invention relates to hydraulic control valves and is more particularly concerned with a hydraulic control valve for transmitting fluid pressure from a transmitter to a receiver to cause movement of an operating member in a receiver. Such hydraulic control valves are particularly suitable for use where it is desired to have remote control of a receiver which may be removed some distance from the transmitter.

A hydraulic control valve for transmitting fluid to a receiver through an actuating line according to the present invention comprises a housing containing an actuating element, a pressure relief valve permanently connected to the actuating line and means for synchronising movement of the element with the receiver. Thus the synchronising means are built into the housing and synchronising can be carried out simply without having to dismantle, bleed or any other such operation.

The synchronising means are preferably operable at a preselected point in the travel of the element, and the synchronising means may be arranged to be actuated by an operating member operating the actuating element.

In a preferred arrangement the synchronising means are carried by the actuating element and the relief valve may also be carried by the actuating element, conveniently the relief valve synchronising means being carried in a bore in the element.

The relief valve and the synchronising means may be interconnected and the element may comprise a piston slidable in a cylinder in the housing. In this case the element may have a rack engaging a pinion rotation of which causes movement of the element. In one construction the housing may contain two such pistons and cylinders opposite sides of the pinion engaging the respective racks so that the elements may move in opposite directions on rotation of the pinion. The pinion may be connected to an operating shaft extending outside the housing and the extension of the shaft may carry an operating handle. The shaft may be hollow and adapted to receive a second concentric shaft adapted to operate a second control valve coupled to the control valve in question, the control valves being coupled, for example, by connecting the housings together.

In any case the synchronising means may comprise a subsidiary piston assembly adapted on movement of the operating element to a selected position to actuate a valve assembly adapted to put in communication a fluid reservoir and the actuating line. Conveniently the subsidiary piston causes the relief valve to open in the synchronising position. The subsidiary piston assembly may engage biasing means biasing the relief valve into its closed position during an actuating stroke.

Preferably the subsidiary piston is actuated by movement of the actuating element and conveniently the length of the subsidiary piston assembly is arranged to determine the position of synchronising.

The invention may be performed in various ways and one specific embodiment and a modification thereof will now be described by way of example with reference to the accompanying drawings, in which:

FIG. 1 is an elevation of a hydraulic control valve according to the present invention, FIG. 2 is a section on the line A—A of FIG. 1, FIG. 3 is a section on the line B—B of FIG. 1, FIG. 4 is a plan view of the element shown in FIG. 1, FIG. 5 is an enlarged view of the control element shown in FIG. 3, FIG. 6 is an enlarged view of an alternative element which may be used in the control valve shown in FIG. 3, and, FIG. 7 is an enlarged view of a further alternative embodiment which may be used in the control valve of FIG. 3.

The control valve shown in FIGS. 1 to 3 comprises a rectangular housing indicated generally at 10 having extending through it parallel to its longer axis and spaced respectively on each side thereof two bores which are similar and of which only one, indicated by 11 together with the control element in it, will be described, the other being substantially identical.

A transverse bore 13 extends through the housing perpendicular to its longitudinal axis, and has a shaft 14 journalled in it which has an extension extending outwardly from one face of the housing onto which an operating handle can be mounted (not shown). Inside the housing the shaft has mounted on it a pinion indicated at 15 which engages a rack on each valve element, as shown at 16 on the valve element in FIG. 5. The racks on two valve elements mounted respectively in the two bores 11 and arranged to engage opposite sides of the pinion 15 so that rotation of the shaft 14 will cause the valve elements in the respective bores to move in opposite directions.

The valve element shown in FIG. 3 is shown in more detail in FIG. 5. As mentioned previously the valve element has a rack 16 engaged by the pinion 15. The rack 16 is mounted on one side of a generally cylindrical element indicated at 18 which slides in the bore 11. The element 18 is provided with an axial bore 20 extending through it and a counter bore 21 at one end. Located in the bore 20 is a piston indicated at 22 having connected to it a series of stepped portions 23, 24 and 25. The stepped portion 25 extends into an axial bore 26 which is joined to a counterbore 27 by a shoulder 28, the bores 26 and 27 being formed in the interior of a pressure relief valve indicated at 30 and the operation of which will be described in the more detail below.

A ball 31 is arranged to be biased by means of a spring 32 against the valve seat formed by the bore 26 and the shoulder 28. The end of the spring 32 opposite the ball 31 abuts against a shoulder 33 on a retaining element 34 which has a passage 35 communicating with the space below the piston and indicated on FIG. 3 at 36.

The element 18 has a transversely extending bore 37 in its side providing communication between a fluid reservoir (not shown) and the annular space surrounding the relief valve 30.

Surrounding the stepped portions 23, 24 and 25 of the piston 22 is a compression spring 38 one end of which engages the piston 22 and the other end of which is mounted to engage a shoulder 41 on the relief valve 30. The relief valve 30 is arranged in its closed position (i.e. the position shown) to have a shoulder 42 abutting against a relief valve seat 43, sealing being accomplished by an O ring 44 mounted in a groove 45 and engaging the tapered end 46 of the relief valve 30.

The piston 22 is provided with a transverse bore 47 through which passes a piston retaining pin 48. The piston retaining pin is of considerably lesser diameter than the transverse bore 47 and serves to permit limited movement of the piston in the axial bore 20 and to retain it in the bore.

The space 36 below the piston is coupled to an actuating line which is connected to a receiver. Movement of the element 18 by means of the operating lever serves to transmit fluid to the receiver.

In operation when it is desired to synchronise the element 18 with respect to the fluid receiver the handle is moved to rotate the pinion 15 to cause the rack 16 to be moved so that its end 50 remote from the operating line is moved towards the corresponding end of the bore 11. As the end 50 approaches the end of the bore the piston 22 strikes a pin 51 extending across the bore 11 and mounted in the housing 10 and then continued movement of the element 18 causes the piston 22 to move in the bore 20 to unseat the ball 31 from its seat. In this condition the passage between the fluid reservoir and the space 36 below the piston is open and fluid can flow either from the reservoir towards the space 36 or vice versa to equalise the pressure in the reservoir and in the actuating line. When the handle is returned to the non synchronising position the spring 38 surrounding the stepped parts of the piston will move the piston back into the position shown in FIG. 5 and hence return the ball to its seat to close the valve.

The pressure relief valve 30 provides pressure relief from the space 36 at any time whilst the valve is operating. If a pressure build up takes place in the system this will be transmitted to the valve 30 and will cause it to unseat from its seat to allow fluid to flow back into the reservoir. Additional flow can also take place past the ball valve 31 since this will probably be unseated as well if the excess pressure in the fluid line is sufficiently great to move the pressure release valve far enough back from its seat to engage the ball 31 against the end of the stepped portion 25 of piston 22.

An alternative arrangement of element for incorporation in the bores 11 is shown in FIG. 6. With this arrangement synchronising can take place when the element is in the centre of the bore, or in other positions as described below. Although only one assembly is shown this arrangement it is used in tandem with a second such assembly in the other bore 11 so that when one element is moved forwardly by one side of the pinion acting on its rack the other element will be moved backwardly by the other side of the pinion acting on its rack.

In this arrangement the element comprises a piston indicated generally at 60 slidable in the bore 11 and having on it a rack 17 similar to the rack 16.

Again the element 60 is provided with an axial bore 61 having a counterbore 62 at one end. Mounted for sliding movement in the bore 61 is a piston 63 having an axially extending rod 64 connected to it and the end 65 of which remote from the piston 63 enters a bore 66 in a relief valve indicated generally at 67, and which relief valve is slidable on the rod 64. The relief valve engages a valve seat 68. An O ring 71 is located in an O ring groove 72 and ensures a seal between the valve 67 and the mating surface 73 of the seat 68 in the closed position. The relief valve 67 is biased by means of a spring 74 into its closed position.

The piston 63 has a slot 75 in it, which also extends substantially throughout its length, a pin similar to the pin 48 being provided at 76 to limit the movement of the piston within the slot, the position of the inner end of the slot being determined by the point in the travel of the element at which synchronising is to take place, in this arrangement at the mid point.

In operation to perform an actuating stroke the piston is moved from the position shown to the left in FIG. 6 and downwardly in FIG. 3 to expel fluid from the space 36 into the actuating line. The pin 76 engages the end of the slot 75 and thus moves the piston 63 with the element. In this condition the spring 74 biases the relief valve 67 into engagement with its seat 68 throughout the actuating stroke. In the event of a fluid pressure build up in the system beyond that at which the relief valve is arranged to open the relief valve can move against the bias of the spring to lift off the seat 68.

On the return stroke the rack is moved by the pinion in the opposite direction and the element will travel with the parts in the position shown in FIG. 6 until the mid point is reached and these parts will be held in this position by the spring 74. When the element reaches the mid point of its travel the end 63A of piston 63 engages the pin 51 (FIG. 3) in the bore 11 and its movement is arrested and thus with further movement of the element 60 the pin 76 disengages from the end of the slot 75. This then causes piston 63 to move in bore 61 thus unseating face 73 from seal 72.

A transverse bore 77 provides communication between the interior of the bore 61 and the reservoir and the rod 64 is provided with a number of axially extending grooves 64a on its end which provide a flow passage.

The area of the relief valve exposed to the pressure in the actuating line, i.e. that portion in the bore 61 is greater than that on the sealing line on face 73 so that the relief valve automatically tends towards an opening position under the influence of the differential area when pressure exists in cavity 36.

The above arrangement has been described for synchronising at its mid point. Such an arrangement is particularly applicable where the receiver is arranged to have an element which moves from a central position to two operating positions equidistant from and on either side of the centre position. Thus movement of the handle on the extension shaft 14 will cause the pinion to rotate in one direction which will move one of the elements in an actuating direction to cause movement of the element in the receiver in one direction from its central point and movement of the handle on the shaft 14 in the opposite direction will cause the other actuation element in the other bore 11 to move the element on the receiver in the opposite direction. The receiver element may be spring biased into the central position.

In order, therefore, to synchronise the element of the receiver with the actuating element it is merely necessary to move the operating handle once in each direction to ensure full synchronisation.

The element on the receiver may be synchronised at a point other than its mid point in which case the elements 60 could be arranged to synchronise at any desires point. In this case the length of the piston could be adjusted accordingly, and also its attendant slot to relieve the pressure on the synchronising valve at the appropriate point.

For example, it could be shortened to the position shown in dotted lines at 78 and the slot accordingly modified so as to synchronise at the end of the stroke as with the arrangement described in FIG. 5.

A further alternative and preferred arrangement is shown in FIG. 7 the element shown replacing the valve element shown in FIG. 3. In this present arrangement, as with the arrangement shown in FIG. 6 synchronising can be arranged to take place at any pre-selected position as more fully described below, but where synchronising takes place in positions other than the end of the bore a second element will be arranged in tandem in another bore 11 so that when one element is moved forwardly by one side of the pinion acting on its rack the other element will be moved backwardly by the other side of the pinion acting on its rack, in a similar manner to that described with reference to FIG. 6.

In the arrangement shown in FIG. 7 the element comprises a piston indicated generally at 81 slidable in the bore 11 and having on it a rack 82 similar to the rack 16.

The element 81 is provided with an axial bore 83 having a counter bore 84 at one end. Mounted for sliding movement in the bore 83 is a piston 85 having an axially extending rod 86 connected to it and the end 87 of which remote from the piston 85 passes through a bore 88 in a piston 89. To the end 87 of the rod 86 is secured a relief valve assembly 90. The assembly 90 includes a O ring 91 which is trapped in that assembly and which ensures a seal between the assembly and a sealing face 92 of the piston 89. The relief valve assembly 90 is biased into its closed position under the action of a spring 93 acting on the piston 85 so that the O ring 91 seals on the sealing face 92. The movement of the relief valve assembly 90 to the right in FIG. 7 is limited by a circlip 94 in the counterbore 84. In a similar manner the movement of the piston 89 to the left in FIG. 7 is also limited by the circlip 94.

FIG. 7 shows the assembly in the synchronising position. In this position the piston 85 has contacted the pin 51 extending across the bore 11 (shown in FIG. 3) causing the relief valve assembly 90 to disengage from sealing face 92. The rod 86 is of such a shape that there is a flow passage between it and the bore 88 in the piston 89. In the synchronising position there therefore exists a flow passage between space indicated at 96, which corresponds to the space 36, and a transverse bore 95 which communicates with the reservoir. The position at which this synchronisation takes place can be predetermined by varying the length of piston 85.

If the piston 81 is moved to the left in FIG. 7 the relief valve assembly 90 will contact piston 89 effecting a seal between O ring 91 and sealing face 92. Further movement of the piston 81 causes an increase in pressure in the fluid in the space 96 which is connected to the receiving element. This increase in pressure will cause the receiving element to move in sympathy with the actuating element.

If the fluid pressure in space 96 should for any reason rise above a predetermined level, this pressure will cause the piston 89 to move away from the relief valve assembly 90. This pressure acts on the difference in area between piston seal 97 and O ring 91 in the relieve valve assembly and directly opposes the force exerted by the spring 93.

Relief valve assembly 90 is so shaped that there is a flow path around its outside and through the circlip 94. Therefore, when piston 89 is lifted from the relief valve assembly 90 there exists fluid flow path between space 96 and the reservoir. The piston 89 will reseat on the relief valve assembly 90 when the pressure has dropped below the predetermined relief valve setting.

Thus, in one simple assembly is provided a relief valve and synchronising valve, the precise function of which can be varied by altering the length of piston 85.

A bank of assemblies such as shown in FIGS. 1 to 5 or as modified as shown in FIGS. 6 or 7 may be coupled together. To this end the assemblies are provided with openings extending through them as indicated at 98 and through which bolts may be passed to connect two or more elements in back to back relationship. Where there are elements with no communication to the exterior the shafts 14 may be arranged to be hollow so that a concentric shaft of smaller diameter can pass through it into an inner element. Thus a bank of valve assemblies may be built up. Also concentric shafts may be arranged to extend from opposite sides.

It will be appreciated that with the present invention a simple valve assembly has been provided which has built in synchronising and relief valves.

Also the present invention provides a closed circuit hydraulic remote control system. The transmitter unit with the built in oil reservoir and operating handle can be connected by a small bore piping to rotary action or linear motion receiver units located considerably distances away, for example up to 150 ft. Moreover, with the present invention it is possible to provide positive and accurate remote control operation with the full retention of operator "feel". The receiver unit can operate in any plane and in any position and a number of transmitting units can be assembled in banks. The transmitter and receiver can be connected by rigid or flexible piping, in addition the built in end of stroke synchronisation or rephasing and automatic overload protection assists in obtaining trouble free operation.

The invention has many applications, for example, the remote control of engine throttles of governors on industrial power plants, vehicles and test beds, positioning on machine tools systems by remote contro, remote operation of directional control valves with retention of "inching" characteristics.

Moreover, it can be used in the field of marine engineering for the remote control of winches, capstans, loading mechanisms and product valves, also in dock and harbours, with dockside loading arms, lock gates, sluices etc. and also on pump control, for example, to provide remote control for servo input on variable capacity pumps.

We claim:

1. A hydraulic control valve for transmitting fluid under pressure from a fluid pressure source to an actuating line of a receiver, said control valve comprising a housing, a bore in said housing, first means carried by said housing for coupling one end of said bore to a fluid pressure source and second means carried by said housing for coupling an opposite end of said bore to an actuating line, an actuating element slidably mounted in said bore, a manually movable operating member operatively connected to said actuating element for shifting said actuating element in said bore with movement of said operating member causing said actuating element to slide in said housing to transmit fluid under pressure from said first means to said second means, fluid flow passage means through said actuating element for placing said first means and said second means in fluid communicating relation, a pressure relief valve carried by said actuating element normally closing said fluid flow passage means and for relieving excess pressure at said second means, and cooperating synchronizing means carried by said actuating element and said housing for automatically opening said fluid flow passage means at a predetermined point in the shifting of the actuating element.

2. A control valve as claimed in claim 1 in which said actuating element has a bore therein at least in part defining said fluid flow passage means, and the relief valve and at least a portion of the synchronizing means are carried in said bore.

3. A control valve as claimed in claim 1 in which the relief valve and the synchronizing means are each interconnected.

4. A hydraulic control valve as claimed in claim 1 in which said bore is in the form of a cylinder, and said actuating element comprises a piston slidable in said cylinder.

5. A control valve as claimed in claim 4 in which the connection between said operating member and said actuating element includes a rack on said actuating element engaging a pinion connected to said operating member for rotation thereby.

6. A control valve as claimed in claim 5 in which there are two of said actuating elements, and said housing contains two of said piston and cylinder disposed on opposite sides of said pinion with said pinion engaging respective racks of said actuating elements for moving said actuating elements in opposite directions upon rotation of said pinion.

7. A control valve as claimed in claim 6 in which the pinion is connected to an operating shaft extending outside the housing.

8. A control valve as claimed in claim 7 in which an extension of said shaft carries said operating member.

9. A control valve as claimed in claim 1 in which said synchronizing means comprises a valve assembly for controlling communication between said first and second means through said fluid flow passage means, and a subsidiary piston assembly coupled to said valve assembly and operable upon movement of said actuating element to a selected position to effect said communication.

10. A control valve as claimed in claim 9 in which said subsidiary piston has means for causing said relief valve to open in the synchronizing position of said actuating element.

11. A control valve as claimed in claim 10 in which there are biasing means for biasing the relief valve into its closed position, and said subsidiary piston assembly engages said biasing means during an actuating stroke of said actuating member.

12. A control valve as claimed in claim 11 in which there are means for actuating said subsidiary piston assembly in response to movement of the actuating element.

13. A control valve as claimed in claim 12 in which said subsidiary piston assembly has a preselected length to determine the position of said actuating element at the time of synchronizing.

14. A control valve as claimed in claim 1 in which said actuating element is in the form of a tubular piston having an axial bore entirely therethrough and at least in part defining said fluid flow passage means, said pressure relief valve being carried by said actuating element at least partially within said bore at one end thereof, and said synchronizing means includes a secondary piston slideable in said bore at the opposite end thereof, and means operatively interconnecting said secondary piston and said pressure relief valve.

15. A control valve as claimed in claim 14 wherein said pressure relief valve includes a first part and a second part, said first part mounted for movement in said bore towards said secondary piston under fluid pressure, resilient means urging said first part away from said piston, said second part being cooperable with said first part to seal said actuating element bore, and said secondary piston being cooperable with said second part to unseat said second part relative to said first part.

16. A control valve as claimed in claim 15 wherein said resilient means urges said secondary piston away from said first part.

* * * * *